United States Patent [19]

Berkey

[11] Patent Number: 5,594,822
[45] Date of Patent: Jan. 14, 1997

[54] FIBER OPTIC COUPLERS, PREFORM AND METHOD OF MAKING SAME

[75] Inventor: George E. Berkey, Pine City, N.Y.

[73] Assignee: Corning Incorporated, Corning, N.Y.

[21] Appl. No.: 567,463

[22] Filed: Dec. 5, 1995

[51] Int. Cl.$^6$ ............ G02B 6/26; C03B 37/023
[52] U.S. Cl. ............... 385/43; 385/42; 385/50; 385/51; 385/96; 385/99; 65/385; 65/406; 65/408; 65/409
[58] Field of Search ............... 385/31, 39, 42, 385/43, 46, 50, 51, 52, 96, 99; 65/385, 406, 407, 408, 409, 411, 412, 428

[56] References Cited

U.S. PATENT DOCUMENTS

| | | | |
|---|---|---|---|
| 4,763,970 | 8/1988 | Berkey | 385/99 X |
| 4,773,924 | 9/1988 | Berkey | 385/43 X |
| 4,919,510 | 4/1990 | Hoke et al. | 385/99 X |
| 5,011,251 | 4/1991 | Miller et al. | 385/43 X |
| 5,044,716 | 9/1991 | Berkey | 385/51 |
| 5,131,735 | 7/1992 | Berkey et al. | 385/43 |
| 5,175,779 | 12/1992 | Mortimore | 385/43 |
| 5,240,489 | 8/1993 | Robson | 385/51 X |
| 5,251,276 | 10/1993 | Berkey et al. | 385/43 |
| 5,251,277 | 10/1993 | Young, Jr. | 385/43 |
| 5,268,979 | 12/1993 | Weidman | 385/42 |
| 5,295,205 | 3/1994 | Miller et al. | 385/1 |
| 5,295,210 | 3/1994 | Nolan et al. | 385/43 |
| 5,351,326 | 9/1994 | Miller | 385/43 |
| 5,412,745 | 5/1995 | Weidman et al. | 385/43 |

Primary Examiner—Brian Healy
Attorney, Agent, or Firm—William J. Simmons, Jr.

[57] ABSTRACT

Overclad fiber optic couplers are made by inserting the uncoated portions of a plurality of optical fibers into the bore of a glass tube, collapsing the tube midregion onto the fibers and stretching the central portion of the tube midregion. The present method utilizes a glass tube the bore of which includes a circular portion and a recess. A plurality of optical fibers are sequentially inserted into the tube by threading the coated end into the circular bore portion until the uncoated portion of fiber is centered in the tube. The uncoated portion of fiber is then transferred laterally into the bore recess. After all fibers have been threaded into the circular bore portion and transferred to the recess, a filler fiber is inserted into the circular bore portion. The resultant coupler exhibits low excess loss.

17 Claims, 5 Drawing Sheets

FIBER OPTIC COUPLERS, PREFORM AND METHOD OF MAKING SAME

BACKGROUND OF THE INVENTION

The present invention relates to overclad fiber optic couplers that exhibit low excess loss.

Overclad fiber optic couplers comprise an elongated matrix glass body through which optical waveguide fibers longitudinally extend. The diameter of the central region of the coupler is smaller than that of the ends of the coupler, whereby the fibers are more closely spaced and are of smaller diameter in the central region than they are at the ends of the unit.

Overclad couplers are usually formed by inserting into the bore of a glass tube at least a portion of each of a plurality of optical fibers so that the fiber portions occupy the midregion of the tube. The tube bore has funnels at each end to facilitate fiber insertion. The resultant coupler preform is evacuated, and its midregion is heated and collapsed onto the fibers. The central portion of the midregion is thereafter drawn down to that diameter and coupling length which is necessary to obtain the desired coupling between the fibers. Often, a sealant such as UV curable epoxy is then applied to the ends of the tube bore for stabilization of the coupled fibers. Couplers having various kinds of coupling characteristics, e.g. wavelength division multiplexer (WDM), achromatic, and the like, have been made by this process. See for example, U.S. Pat. Nos. 4,931,076, 4,979,972, 5,009,692 and 5,011,251.

When the tubing glass is collapsed around the fibers, the fibers are subjected to forces that bend them. Overclad coupler process reproducibility and excess loss are significantly impacted by this bending of the fibers and by the reproducibility of the fiber geometry in the coupler preform prior to the stretch step. Depending on the location of the fibers within the bore and upon such factors as twist, tension, and the like, during the tube collapse step, the resultant couplers can exhibit high variability and high excess loss.

For certain types of couplers, for example, 1×N couplers where N≧2, the problem of fiber twist during the tube collapse step was remedied by employing a small diameter tube bore. See U.S. Pat. No. 4,979,972. The coupler is formed of standard single-mode fiber having an outside diameter of 125 μm and a 250 μm coating diameter. Coating is stripped from a central portion of a first fiber intermediate its ends, thus leaving two coated end portions. Coating is also stripped from an end portion of a second fiber. The diameter of the tube bore is made as small as possible so that the walls thereof will need to undergo a minimum of inward movement before total collapse onto the fibers is achieved. A bore size that is sufficiently larger than the coating diameter, for example 270 μm, will permit one coated end portion of the first fiber to be threaded through the bore without coating material rubbing onto the surface of the bore. The stripped end of the second fiber can be inserted into the bore simultaneously with the stripped portion of the first fiber or after the stripped portion of the first fiber has been centered in the tube midregion. In either event, the stripped portions of the two fibers can be centered in the midregion of a tube having a bore that is only slightly larger than the combined diameter of the two stripped fiber portions. Devices having very low excess loss have been made by this technique.

However, as the coating diameter becomes larger than twice the fiber diameter, the tube bore diameter must be made larger in order to accommodate the coating. The larger diameter bore will adversely affect device excess loss.

A coupler having more than one fiber that is stripped in its central portion, such as a 2×2 coupler, also requires a relatively large bore. One fiber can be threaded through the bore until the stripped portion is centered in the tube midregion and the ends of the coated portions are located in the funnels. The second fiber is then threaded through the bore by first inserting one of its coated end portions. Thus, the bore diameter must be slightly larger than the combination of the fiber diameter plus the coating diameter. When using this combination of fibers and tube, fibers can easily become twisted during the tube collapse step, and the resultant device can therefore exhibit large excess loss.

One attempt at preventing fiber bending during the tube collapse step was to fill any excess space in the tube bore with spacer fibers composed of material which is the same as or similar to that of the tube. The idea is that the spacer fiber will prevent twisting or bending of the optical fibers by reducing space in the tube bore by creating a tighter fit. While this method will produce a high reliability coupler with low excess loss, it is cumbersome and not likely to be automated.

Fiber optic couplers having low polarization dependent loss can be made by employing a tube that has a relatively hard glass (high silica content) in the region adjacent the fibers. However, when tubes having conventionally shaped bores (for example, circular cross-section bores) are formed of such high silica content glass, the problem of fiber bending during tube collapse can be exacerbated, and excess loss can be increased.

SUMMARY OF THE INVENTION

It is therefore an object of the present invention to provide an easily manufacturable overclad fiber optic coupler having low excess loss. Another object is to provide a method of manufacturing overclad fiber optic couplers that exhibit both low polarization dependent loss (PDL) and low excess loss. A further object of the invention is to provide a method of making a fiber optic coupler wherein the fibers are secured in place during the tube collapse step, whereby the coupler preform exhibits reproducibility of fiber geometry prior to the coupler preform stretch step.

Briefly, the present invention relates to a method of making an overclad fiber optic coupler and the resultant low loss coupler. Employed in this method is a glass tube having first and second end surfaces, a midregion and first and second opposite end regions extending from the midregion to the end surfaces. A longitudinal bore extends within the tube. The bore has a first portion and a recess extending from the first portion. The recess is capable of receiving two or more uncoated optical fibers. Protective coating is stripped from a first optical fiber such that it is composed of an uncoated portion that joins first and second coated portions. Protective coating is stripped from a portion of a second optical fiber such that it is composed of uncoated and coated portions. The optical fibers are inserted into the bore such that the uncoated portions are located within the recess. The step of inserting the optical fibers includes inserting the coated end of the first optical fiber into the first portion of the bore, threading the first optical fiber through the bore until the uncoated portion extends through the first portion of the bore, and transferring the uncoated portion of the first optical fiber from the first portion of the bore into the recess. Thereafter, a filler fiber is inserted into the first portion of the bore. The tube is heated to collapse the tube midregion onto the fibers, and to at least a portion of the midregion is drawn such that the diameter of the portion of the midregion is smaller than the diameters of the tube at the end regions.

The recessed portion of the bore can be provided with one or more longitudinal grooves capable of receiving additional fibers that are to be coupled.

The resultant low loss fiber optic coupler comprises an elongated body of matrix glass with a neckdown region in the center of the tube where the diameter of the coupler is less than the diameter at the ends and where the stripped fibers are fused along a portion of their lengths.

Figure 1:
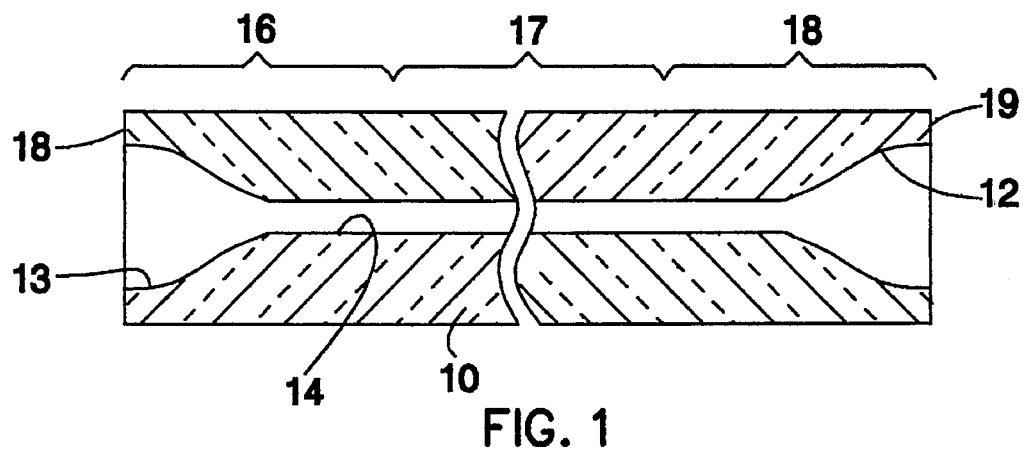
FIG. 1 is a cross-sectional view of the glass preform tube used for forming the fiber optic couplers of this invention.

The drawings are not intended to indicate scale or relative proportions of the elements therein.

DESCRIPTION OF THE PREFERRED EMBODIMENTS

A typical embodiment of the glass preform tube of this invention is illustrated in FIGS. 1–4. Tube 10 has a longitudinal bore 14 that is connected to end surfaces 18 and 19 by funnels 12 and 13. The tube has a midregion 15 and opposed end regions 16 and 17 between the midregion and end surfaces 18 and 19, respectively.

The cross-sectional configuration of bore 14 is described as it appears in a plane perpendicular to the central longitudinal axis of tube 10. Bore 14 includes a first portion 30 and a recess 29 extending from the first portion. The minimum cross-sectional dimension of portion 30 is greater than the diameter d of fiber coatings 25 and 26. Recess 29 is a cavity that extends from portion 30; it has an oblong cross-sectional shape. Bore 14 is created by collapsing a glass tube around a carbon rod having a cross-sectional shape that will correspond to the desired bore shape and subsequently burning out the carbon rod as disclosed in U.S. Pat. No. 4,750,926. This process leaves a longitudinal bore through the interior length of the tube. Funnels 12 and 13 can be etched in accordance with the method described in U.S. Pat. No. 5,152,816.

A filler fiber 28 extends through first portion 30. Coated optical fibers 21 and 22 have coated portions 25 and 26, respectively, and uncoated or stripped portions 23 and 24, respectively. Uncoated portions 23 and 24 extend in proximal arrangement through recess 29. The cross-sectional length 1 of the recess is approximately equal to the sum of the diameters D of uncoated optical fibers 23 and 24. The cross-sectional width w of recess 29 is slightly greater than the diameter D of uncoated optical fiber 23 or 24. Uncoated optical fibers 23 and 24 preferably fit into recess 29 such that they are separated from the recess walls by only a few micrometers. There is preferably a similar fit between filler fiber 28 and portion 30. When the fibers are packed in the recess in this manner, the tube needs to flow only a small amount in order to fill any voids in the coupler preform during tube collapse. Thus, this arrangement results in the least amount of fiber twist during tube collapse. However, the relatively tight-fitting arrangement described above is not a necessity. For example, couplers having low excess loss were made from coupler preforms in which the diameter of the circular portion of the bore was 30 µm larger than the diameter of the filler fiber.

The refractive index of the filler fiber should be less than the refractive index of the claddings of the optical fibers and is preferably equal to or greater than the refractive index of that portion of the tube adjacent to the bore. To avoid any adverse impact the optical characteristics of the resultant coupler, the refractive index of the filler fiber should be substantially the same as that of the inner region of the tube adjacent bore 14. The filler fiber is ideally composed of the same material as that from which the inner region of the tube is formed.

Figure 4:
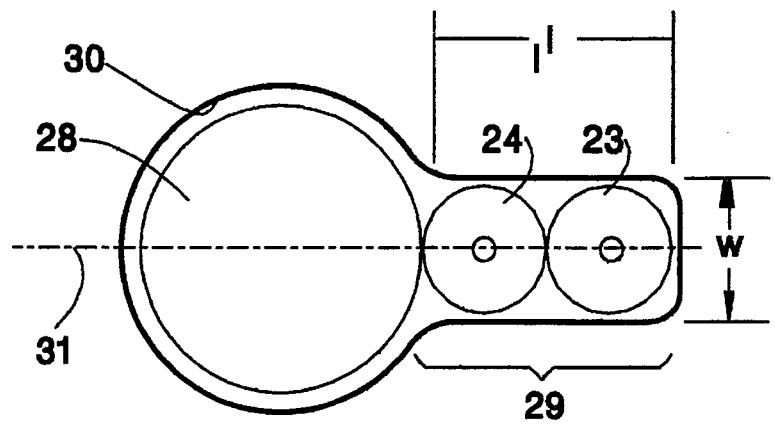
FIGS. 4–10 illustrate various preform tube bore shapes.
Figure 5:
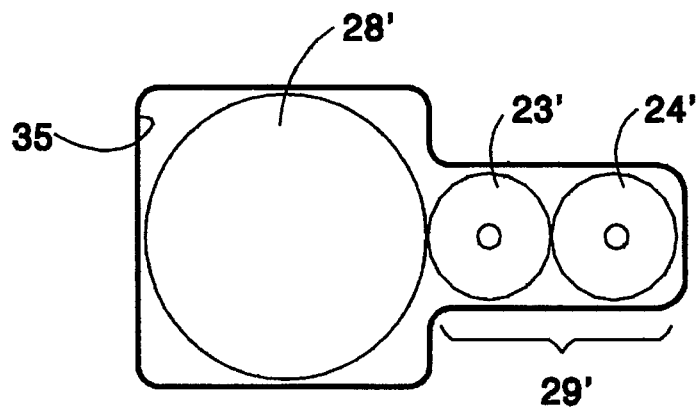
Figure 6:
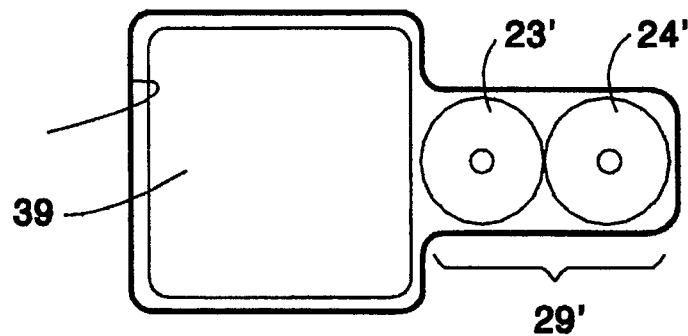

In the embodiments of FIGS. 5 and 6, elements similar to those of FIG. 4 are represented by primed reference numerals. FIG. 5 illustrates that the cross-sectional shape of the filler fiber 28' need not be the same cross-sectional shape as the first portion 35 of the bore. During the tube collapse step, the corner regions of the square-shaped first portion 35 will gradually collapse onto circularly-shaped filler fiber 28' until the voids are eliminated.

FIG. 6 shows that the cross-sectional shape of the filler fiber can be other than circular. Although filler fiber 39 and first bore portion 38 are shown as being square, other shapes could be employed. However, it is required that the fiber coating can fit within the first bore portion and that the sizes and shapes of the first bore portion and the filler fiber are such that the filler fiber secures the uncoated fiber portions in the recess during tube collapse.

It is noted that a circularly-shaped filler fiber is the simplest to make, since surface tension acts on a fiber as it is being drawn to tend to make it circular. Thus, a perfectly square preform would become rounded at its corners while it is being drawn to a fiber. In a preferred embodiment, the cross-sectional shapes of both the first bore portion and the filler fiber are round.

Figure 7:
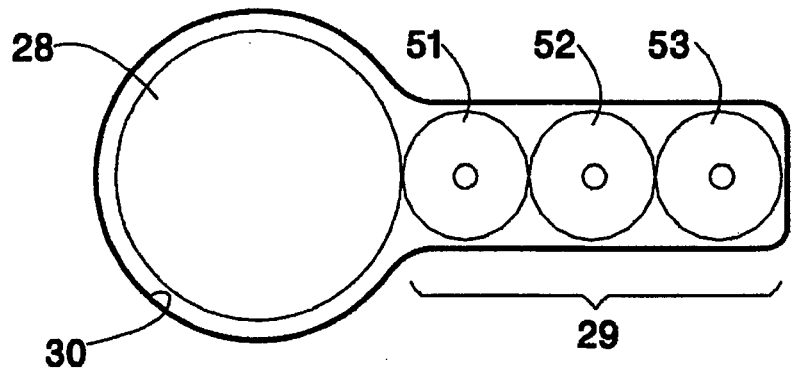
Figure 8:
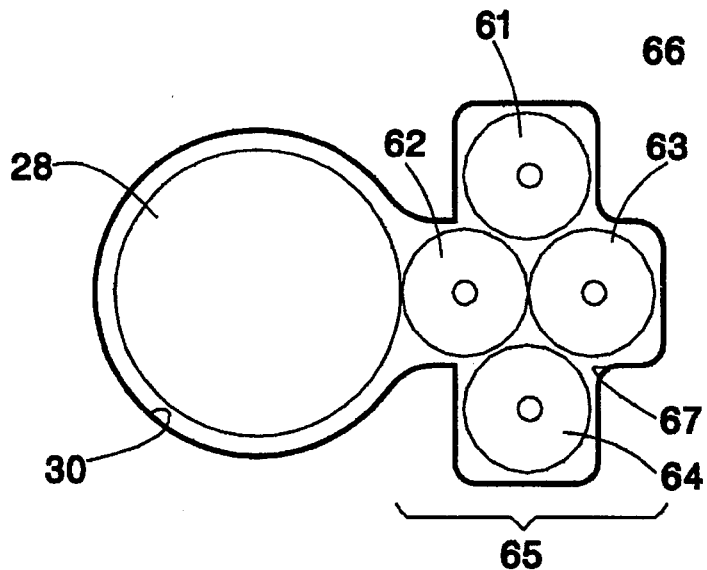
Figure 9:
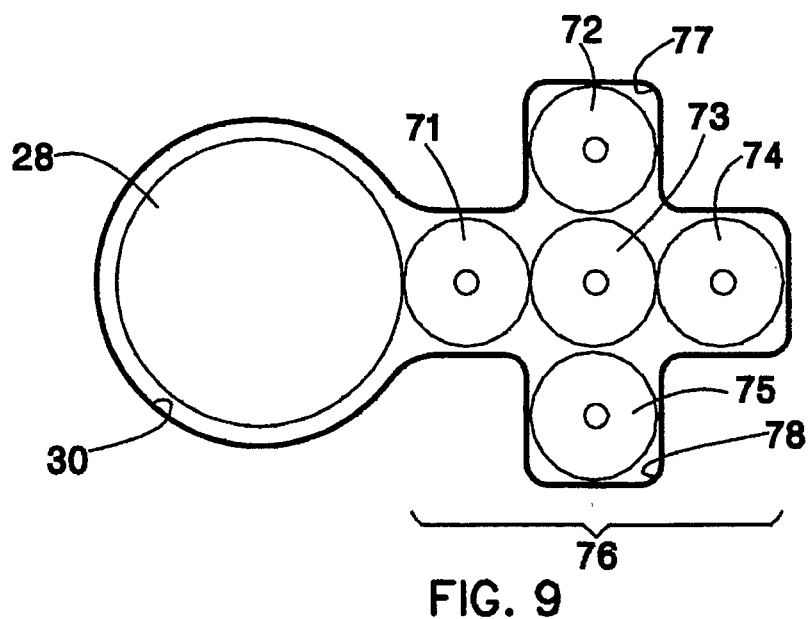
Figure 10:
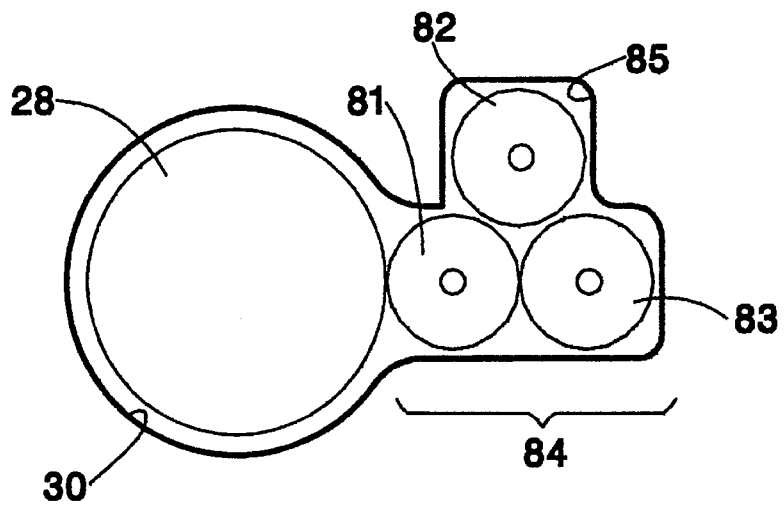

FIGS. 7–10 show other bore cross-sectional shapes; specifically, different recess shapes capable of receiving a plurality of stripped fibers. Each of these figures shows a circularly-shaped first bore portion 30 and a filler fiber 28. FIG. 7 shows three uncoated optical fibers 51, 52 and 53 in proximal contact along an oblong recess 54. In the embodiment of FIG. 8, a recess 65 confines uncoated optical fibers 62 and 63. Recess 65 has grooves 66 and 67, that are capable of receiving uncoated optical fibers 61 and 64, respectively. Grooves 66 and 67 are located in such a way with respect to recess 65 that the four uncoated optical fibers 61–64 form a diamond shaped array. FIG. 9 shows a further embodiment that is capable of supporting five uncoated optical fibers 71–75. A recess 76 supports fibers 71, 73 and 74. Recess 76 contains grooves 77 and 78 for receiving uncoated optical fibers 72 and 75, respectively. Grooves 77 and 78 are located in such a way with respect to recess 76 that the five uncoated optical fibers form a cross shape when aligned in proximal arrangement. In FIG. 10, a recess 84 confines uncoated optical fibers 81 and 83, and a groove 85 confines uncoated optical fiber 82. Groove 85 is located in such a way with respect to recess 84 that the three uncoated optical fibers 81–83 form a triangular array.

In FIGS. 7–10 the length of each recess is approximately equal to the sum of the diameters of uncoated optical fibers that are disposed therein, and the width of each recess is approximately equal to the diameter of an uncoated optical fiber. The length and width of each groove is about equal to the diameter of an uncoated optical fiber.

Assuming that standard 125 μm single-mode optical fibers are employed in the manufacture of optical couplers, the following dimensions could be employed. In the embodiments of FIG. 7 and 9, the length of recesses 54 and 76 could-be-about 380 μm. The length of recesses 29, 65 and 84 could be about 255 μm. The length of grooves 66 and 67 of FIG. 8 and groove 85 of FIG. 10 could be about 130 μm, and the length of grooves 77 and 78 of FIG. 9 could be about 130 μm. The width of each recess and groove is about 127–132 μm.

It is noted that most of the embodiments (see FIGS. 4, 7, 8 and 9) have a non-circular, bilaterally symmetrical longitudinal bore. As used herein, the term "bilaterally symmetrical" means that the bore is symmetrical with respect to a first plane parallel to the central longitudinal axis of the bore (see plane 31 of FIG. 4), but it is not symmetrical with respect to a any plane parallel to the central longitudinal axis of the bore and perpendicular to the first plane.

Preform tubes of the type described above can be employed in the manufacture of optical fiber couplers in accordance with the following examples.

Figure 2:
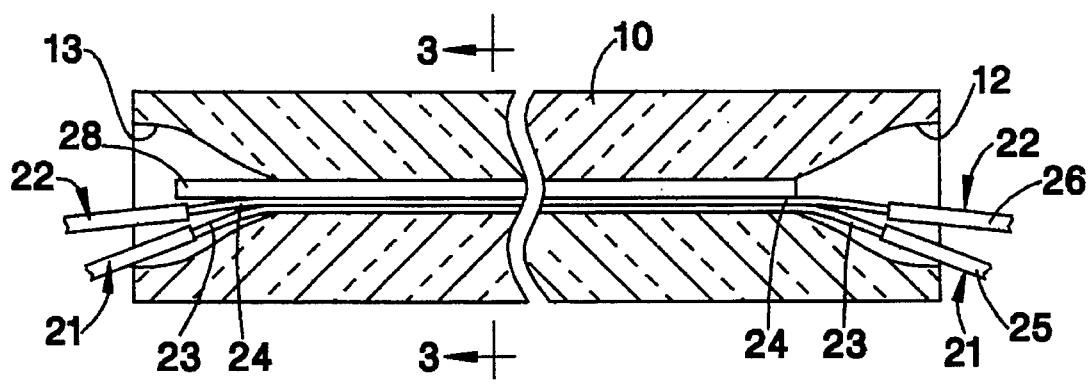
FIG. 2 is a cross-sectional view of a fiber optic coupler preform.
Figure 3:
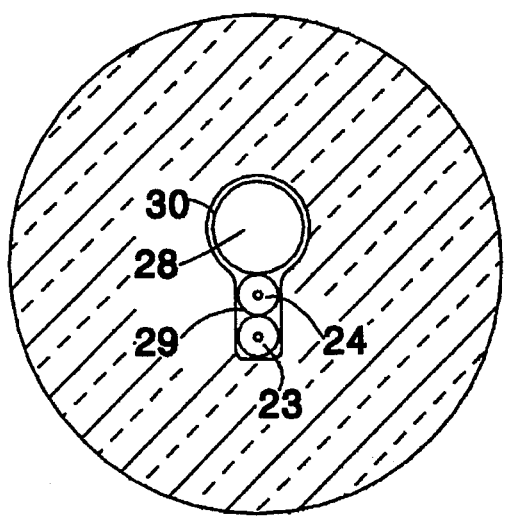
FIG. 3 is a cross-sectional view taken along the line 3—3 of FIG. 2.

A preform tube having the cross-sectional configuration of FIGS. 3 and 4 can be employed in the following method to make a 2×2 coupler. As shown in FIG. 2, coating material is stripped from a portion of each of the coated optical fibers 21 and 22 intermediate its ends. The length of the uncoated portions is slightly shorter than the length of tube 10. The end of a coated portion 25 of optical fiber 21 is threaded through the circular portion 30 of bore 14 until the uncoated portion 23 of the fiber is longitudinally centered in the tube. Fiber 21 is moved laterally to transfer uncoated portion 23 into the bottom of recess 29. The end of a coated portion 26 of optical fiber 22 is then threaded through circular portion 30 of bore 14 until the uncoated portion 24 of the fiber is longitudinally centered in the tube. Fiber 21 is moved laterally to place uncoated portion 24 against uncoated portion 23 in recess 29. As shown in FIG. 2, the coated portions of the fibers typically extend into funnels 12 and 13. Filler fiber 28 is inserted into the circular portion 30 of bore 14. The filler fiber secures the optical fibers into the recess and restricts movement or bending of the fibers during subsequent steps.

The resultant coupler preform is then heated to collapse the tube midregion onto the filler fiber and the optical fibers, and at least a portion of the midregion is stretched until the desired coupling properties are obtained. A single heating step can be employed for both the collapse and stretch steps. Alternatively, after the tube midregion has been collapsed, the coupler preform can be reheated for the stretch step. In some instances, more than one stretch step is employed, each having a separate heating step.

Figure 11:
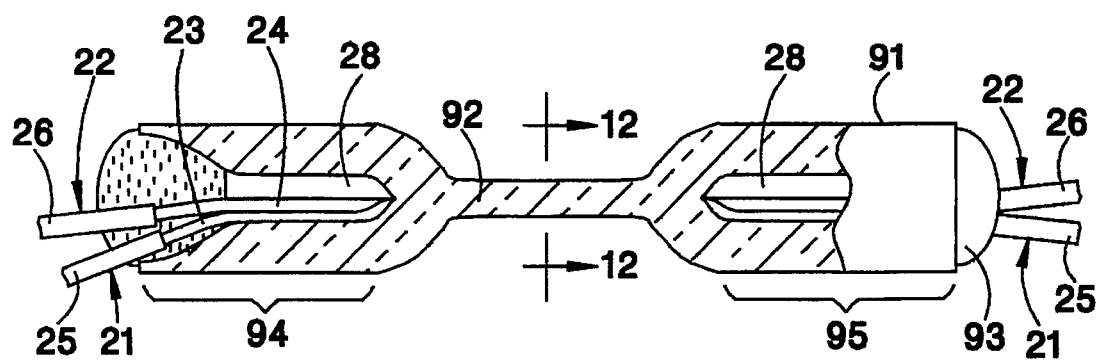
FIG. 11 is a partial cross-sectional view of a coupler that is sealed at both ends.
Figure 12:
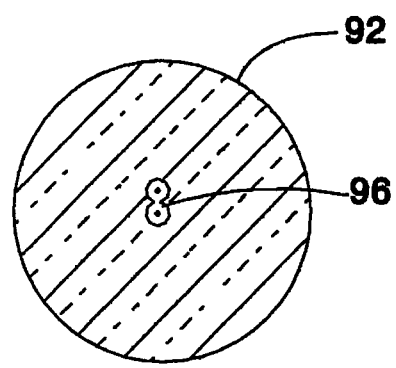
FIG. 12 is a cross-sectional view taken along line 12—12 of FIG. 11.

The resultant fiber optic coupler is shown in FIG. 11. The coupler comprises an elongated body of matrix glass 91 with a neckdown region 92 and two opposite end regions 94 and 95. Epoxy 93 can then be added to the fibers in the end regions of the tube as taught in U.S. Pat. No. 5,009,692. Each end region has multi-part bore from which extends two coated optical fiber portions 21 and 22. In the neckdown region 92, the optical fibers are fused along a portion of their lengths forming a coupling region 96 as shown in FIG. 12. The filler fiber 28 fuses with and becomes part of the surrounding tube structure in the coupling region. A consequence of using a preform tube of this invention to form the coupler of FIG. 11 is that the geometrical center of the fibers in the coupling region does not fall on the central longitudinal axis of the neckdown region as shown in FIG. 12. It can also be observed from FIG. 11 that the diameter of the neckdown region is less than that of the end regions.

Couplers made in accordance with the above example exhibit an excess loss as low as 0.1 dB.

Other types-of-couplers, namely 1×4 couplers and 2×4 couplers, made by the method of this invention also exhibited an excess loss as low as 0.1 dB. The methods employed to make 1×4 and 2×4 couplers used tubes having the bore configurations of FIGS. 9 and 8, respectively.

Couplers of the 2×2 type were formed in accordance with U.S. Pat. No. 5,251,277, whereby the inner region of the tube was formed of a relatively hard glass. As expected, the PDL was very low, namely 0.2 dB. Even though the inner region of the tube that collapsed onto the fibers was relatively hard, the excess loss was as low as 0.1 dB.

Figure 13:
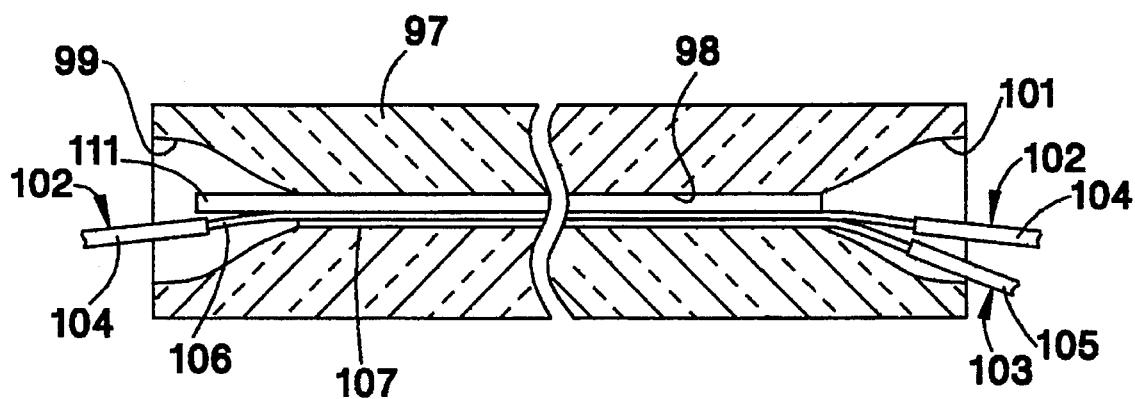
FIG. 13 is a cross-sectional view of a fiber optic coupler preform.

The method of the invention can also be used to make coupler preforms that employ at least one coated optical fiber that is stripped at one end. Referring to FIG. 13, tube 97 has a bore 98 and funnels 99 and 101. The cross-sectional configuration of bore 98 is the same as that of bore 14 of FIG. 3. Coating material is stripped from a portion of coated optical fiber 102 intermediate its ends to form coated portions 104 and uncoated portion 106. Coating material is stripped from a portion of coated optical fiber 103 at one end thereof to form coated portion 105 and uncoated portion 107. The lengths of uncoated portions 106 and 107 are slightly shorter than the length of tube 97. Uncoated portion 107 could be inserted into the circular portion of bore 98 and then moved laterally to position it in the bottom of the bore recess. Alternatively, uncoated portion 107 could be inserted directly into the recess of bore 98. The end of a coated portion 104 of optical fiber 102 is then threaded through the circular portion of bore 98 until the uncoated portion 106 thereof is longitudinally centered in the tube. Fiber 102 is moved laterally to place uncoated portion 106 against uncoated portion 107 in the recess portion of bore 98. Filler fiber 111 is then inserted into the circular portion of bore 98. As in the previous embodiments, the filler fiber secures uncoated portions 106 and 107 into the recess.

It is noted that uncoated portion 106 could be inserted first so that it is positioned in the bottom of the recess. However, it is preferred that uncoated portion 107 be positioned in the bottom of the recess and uncoated portion 106 be positioned over portion 107 since portion 106 has two uncoated ends that can be employed to move portion 106 laterally to ensure that both uncoated portions are within the entire length of the recess at the time that the filler fiber 111 is inserted.

The resultant coupler preform is then heated to collapse the tube midregion and to stretch at least a portion of the tube midregion to form a coupler as described above. The resultant fiber optic coupler is similar to that shown in FIG. 11 except that two coated fiber portions extend from one end thereof and only one coated fiber portion extends from the other end.

I claim:

1. A method of making a fiber optic coupler comprising the steps of:

providing a glass tube having first and second end surfaces, a midregion and first and second opposite end regions extending from said midregion to said first and second end surfaces, respectively, and a longitudinal bore extending within said tube, said bore having a first portion and a recess extending from said first portion, said recess being capable of receiving two or more uncoated optical fibers in proximal arrangement;

stripping protective coating from at least one optical fiber such that said at least one fiber is composed of an uncoated portion that joins first and second coated portions;

stripping protective coating from a portion of another optical fiber such that said at least one fiber is composed of uncoated and coated portions;

inserting said optical fibers into said bore such that said uncoated portions are located within said recess, the step of inserting said optical fibers including inserting the coated end of said at least one optical fiber into the first portion of said bore, threading said at least one optical fiber through said bore until the uncoated portion extends through said first portion of said bore, and transferring the uncoated portion of said at least one optical fiber from said first portion of said bore into said recess;

thereafter, inserting a filler fiber into said first portion of said bore;

heating said tube to collapse said tube midregion onto said fibers; and drawing at least a portion of said midregion such that the diameter of said portion of said midregion is smaller than the diameters of said tube at said end regions.

2. The method of claim 1 wherein the uncoated portion of each of said optical fibers is initially positioned in the first portion of said bore and then transferred laterally into said recess.

3. The method of claim 1 wherein the steps of stripping coating from said at least one and said another optical fibers comprise stripping protective coating from a plurality of optical fibers such that each optical fiber is composed of an uncoated portion that joins first and second coated portions.

4. The method of claim 3 wherein the step of inserting comprises inserting a coated end of a first of said optical fibers into the first portion of said bore and threading said first fiber through the first portion of said bore until the uncoated portion thereof extends through said first portion of said bore, transferring the uncoated portion of said first optical fiber from said first portion of said bore into said recess, and sequentially inserting a coated end of each of the remainder of said plurality of optical fibers into the first portion of said bore until the uncoated portion thereof extends through said first portion of said bore, and transferring the uncoated portion thereof from said first portion of said bore into said recess.

5. The method of claim 1 wherein said bore comprises a substantially circular portion and an adjacent non-circular portion that forms said recess.

6. The method of claim 5 wherein said filler fiber is circular in cross-section.

7. The method of claim 1 wherein said recess is an oblong cavity with a width commensurate with the diameter of said uncoated fibers and a length commensurate with the sum of the diameters of said uncoated fibers.

8. The method of claim 7 wherein said oblong cavity includes a longitudinal groove capable of receiving said uncoated fibers, said groove having a width commensurate with the diameter of said uncoated fibers and a length commensurate with the diameter of said uncoated fibers.

9. The method of claim 7 wherein said oblong cavity includes a plurality of longitudinal grooves capable of receiving said uncoated fibers, said grooves having a width commensurate with the diameter of said uncoated fibers and a length commensurate with the diameter of said uncoated fibers.

10. A glass preform tube for forming a fiber optic coupler that incorporates at least two optical fibers, each having a core, a cladding of diameter D and a protective coating of diameter d on said cladding, said tube having a longitudinal bore, the cross-sectional configuration of which includes a first portion and an adjacent non-circular portion forming an oblong recess having a width commensurate with the diameter of an uncoated optical fiber and a length commensurate with the sum of the diameters of a plurality of uncoated optical fibers, the minimum cross-sectional dimension of said first portion being at least as large as said diameter d.

11. The preform tube of claim 10 wherein said first portion is substantially circular in cross-section.

12. The preform tube of claim 10 wherein said oblong recess further includes at least one longitudinal groove having a width larger than D and a length larger than D.

13. The preform tube of claim 10 wherein said bore is bilaterally symmetric.

14. A fiber optic coupler comprising an elongated body of matrix glass having a neckdown region and two opposite end regions each having a non-circular longitudinal bore, and at least two optical fibers, each having a core surrounded by a cladding of diameter D, said fibers being fused together along a portion of their lengths in said neckdown region to form a coupling region and not being fused in each of said two opposite end regions, the cross-sectional configuration of said bore including a first portion and an adjacent non-circular portion forming an oblong recess having a width greater than D, said fibers being situated in said recess in said end regions, at least one of said fibers extending beyond one end of said tube, and at least two of said fibers extending beyond the remaining end of said tube, those portions of said fibers that extend beyond the ends of said tube having a coating of diameter d, the minimum cross-sectional dimension of said first portion of said bore being equal to or greater than d.

15. The fiber optic coupler of claim 14 wherein the cross-sectional configuration of said bore is bilaterally symmetric.

16. The fiber optic coupler of claim 14 wherein the geometric center of said coupling region is not located on the central longitudinal axis of said neckdown region.

17. The fiber optic coupler of claim 14 wherein the diameter of said neckdown region and the diameters of said optical fibers in said coupling region are smaller than their respective diameters at said opposite end regions.

* * * * *